United States Patent
Barley et al.

(10) Patent No.: US 9,042,204 B2
(45) Date of Patent: May 26, 2015

(54) ELECTRONIC WILDLIFE CALL

(75) Inventors: Christopher B. Barley, Grand Prairie, TX (US); James Brandon Roach, Grand Prairie, TX (US)

(73) Assignee: WGI INNOVATIONS, LTD., Grand Prairie, TX (US)

( * ) Notice: Subject to any disclaimer, the term of this patent is extended or adjusted under 35 U.S.C. 154(b) by 848 days.

(21) Appl. No.: 12/984,947

(22) Filed: Jan. 5, 2011

(65) Prior Publication Data

US 2012/0008464 A1 Jan. 12, 2012

Related U.S. Application Data

(63) Continuation-in-part of application No. 29/365,449, filed on Jul. 9, 2010, now Pat. No. Des. 641,273, and a continuation-in-part of application No. 29/365,453, filed on Jul. 9, 2010, now Pat. No. Des. 641,274, and a continuation-in-part of application No. 29/365,455, filed on Jul. 9, 2010, now Pat. No. Des. 641,275.

(51) Int. Cl.
| | |
|---|---|
| *G10K 11/00* | (2006.01) |
| *G10K 15/02* | (2006.01) |
| *A01M 31/00* | (2006.01) |

(52) U.S. Cl.
CPC ............. *G10K 15/02* (2013.01); *A01M 31/004* (2013.01)

(58) Field of Classification Search
USPC .............................. 340/2.71; 700/94; 367/197
See application file for complete search history.

(56) References Cited

U.S. PATENT DOCUMENTS

| | | | | |
|---|---|---|---|---|
| 5,555,664 | A | * | 9/1996 | Shockley ............................ 43/1 |
| 5,572,592 | A | * | 11/1996 | Muckelrath ..................... 381/56 |
| 5,802,197 | A | | 9/1998 | Fulcher |
| 6,494,166 | B1 | | 12/2002 | Cornell |
| 6,757,574 | B2 | * | 6/2004 | Gardner et al. ................. 700/94 |
| D508,720 | S | * | 8/2005 | Yuen ............................ D21/405 |
| 7,831,756 | B1 | * | 11/2010 | Fils ............................... 710/303 |
| 8,150,460 | B1 | * | 4/2012 | Curtis et al. .................. 455/557 |
| 2004/0243263 | A1 | | 12/2004 | Gardner et al. |

(Continued)

OTHER PUBLICATIONS

Gander Mountain, Extreme Dimensions Mini Phantom Digital Predator Call, 2 web pages; Extreme Dimensions Mini Phantom Digital Call Speaker, 1 web page; Extreme Dimensions Mini Phantom Remote Digital Call, 2 web pages; Cass Creek Electronic Fox Call, 2 web pages; Cass Creek Mini Series Predator Electronic Call, 2 web pages; Cass Creek Nomad Series Predator Call, 2 web pages; FoxPro SpitFire Digital Call, 2 web pages; FoxPro Fury 1000 Digital Game Call, 2 web pages; gandemountain.com/.../details.cgi?i=4..., Mar. 19, 2010.

(Continued)

*Primary Examiner* — Vernal Brown
(74) *Attorney, Agent, or Firm* — Geoffrey A. Mantooth

(57) ABSTRACT

An electronic wildlife call has electronics and a housing. The electronics includes an electronic sound generator, memory containing at least one sound call, and at least one speaker connected with the sound generator. The housing contains the electronics and has an upper portion and a lower portion. Legs are coupled to the lower portion of the housing. The legs are movable between a deployed position and a stowed position, wherein when the legs are in the deployed position, the housing is elevated above the ground. The housing has a docking port for receiving a remote control. When the remote control is located in the docking port, the power supply in the remote control is recharged and calls are synced.

23 Claims, 10 Drawing Sheets

(56) References Cited

U.S. PATENT DOCUMENTS

2005/0075045 A1    4/2005    Williamson, III
2006/0130718 A1*   6/2006    Lo et al. ........................ 108/131

OTHER PUBLICATIONS

Cass Creek, Nomad Wild Boar Receiver Only, 1 web page, casscreek.com/.../69-Nomad-Wild-Boar...; Big Horn Remote Speaker, 1 web pages, casscreek.com/.../55-Big-Horn-Remote-...; Ampli-Fire Moose/Deer Combo Call, 1 web page, casscreek.com/65-Ampli-Fire-Moose-..., Mar. 19, 2010.

Cablela's, FoxPro TX-500 Fury Electronic Caller, 2 web pages; Western Rivers Nite Stalker Electronic Call, 2 web pages; Western Rivers Apache Game Caller, 2 web pages; Primos Power Dogg Electronic Call, 2 web pages; cabelas.com/.../standard-item.jsp?id=0..., Mar. 19, 2010.

Midway USA, Fox Pro FX3 Electronic Predator Game Call with 32 Digital Sounds Realtree Max-1, 2 web pages, midwayusa.com/viewProduct/?product..., Mar. 19, 2010.

Primos Hunting Calls, Electronics Calls, 1 web page, ...primos.com/c-8-electronic-calls.aspx; e-DEER Electronic Calls, 2 web pages, shop.primos.com/pc-789-8-e-deer.aspx, Mar. 19, 2010.

GameCalls.Net, Johnny Stewart Attractor Crow Call 1 w/Remote, 1 web page, gamecalls.net/.../Johnny_Stewart_Attra...; Western Rivers Predation DEER Mini, 1 web page, gamecalls.net/.../Western_Rivers_Pred....; Woods Wise Replicator Digital Coyote, Fox & Bobcat Predator Call with 10 Sounds, 1 web page, gamecalls.net/.../Woods_Wise_Replicat...; Knight & Hale Total eCall with Remote DEER, 2 web pages, gamecalls.net/.../Knight_Hale_Total_eC..., Mar. 19, 2010.

Johnny Stewart Wildlife Calls, Preymaster Digital Caller, 1 web page; Wireless Preymaster Digital Caller, 1 web page, johnnystewart.com/.../update_display.c..., Mar. 19, 2010.

Walmart.com-Cyclops Flare 3 Watt Ha..., 1 web page, walmart.com/catalog/detail.gsp?image...; Cyclops Flare 3 Watt Handheld Spot Light, 3 web pages, walmart.com/ip/.../12347134?sourceid...; Cyclops CYC-9WS Thor X Sirius Rechargeable Hand Held Spotlight-Strobe Light-LED-9W-Black, buy.com/prod/.../208787178.html, 4 web pages, Apr. 19, 2010.

* cited by examiner

ELECTRONIC WILDLIFE CALL

This application is a continuation-in-part of U.S. application Ser. No. 29/365,449 filed Jul. 9, 2010 now U.S. Pat. No. D641,273; U.S. application Serial No. 29/365,453 filed Jul. 9, 2010 now U.S. Pat. No. D641,274; and U.S. application Serial No. 29/365,455 filed Jul. 9, 2010 now U.S. Pat. No. D641,275.

FIELD OF THE INVENTION

The present invention relates to electronic wildlife or animal calls of the type that produce sounds emulating that of wildlife.

BACKGROUND OF THE INVENTION

Wildlife or animal calls have been in use for a long time, particularly by hunters. A hunter or operator uses the call to make sounds like an animal makes. For example, to attract deer, a hunter may produce sounds that emulate a buck or a doe. To attract coyotes, or other predators, a hunter may produce sounds that emulate a rabbit in distress. To attract ducks, a hunter may use a duck call.

Traditionally, wildlife calls have been manually generated, such as by blowing one's breath across a reed or vibrating membrane or by scratching a plate surface or vibrating a box. Such calls take experience to operate successfully and are limited to making only a small number of specific sounds, say for ducks or turkey.

Recently, electronic calls have come into use. In an electronic call, a number of unrelated animal calls can be stored in memory as sound files and reproduced. Little skill is required to operate an electronic call.

While little skill may be required for operation, nonetheless, prior art electronic game calls require some effort and skill on the part of the user to select the call and operate the device. It is desired to simplify the use of an electronic call and to provide some protection from the elements.

SUMMARY OF THE INVENTION

An electronic wildlife call comprises an electronic sound generator, memory containing at least one sound call, the memory being connected to the sound generator, and at least one speaker connected with the sound generator. A housing contains the electronics. The housing has an upper portion and a lower portion. Legs are located on the housing lower portion. The legs are movable between a deployed position and a stowed position, wherein when the legs are in the deployed position and the wildlife call is set on the ground by the legs, the housing is elevated above the ground.

In accordance with one aspect, the legs pivot to move between the deployed and stowed positions.

In accordance with another aspect, a handle is located on the housing upper portion.

In accordance with still another aspect, the call further comprises a display and controls located on the housing upper portion.

In accordance with still another aspect, the housing has two ends, with the speaker located in one of the ends.

In accordance with still another aspect, the electronics comprises a receiver. There is also a remote control with a transmitter that communicates with the receiver.

In accordance with still another aspect, the legs pivot to move between the deployed and stowed positions. A handle is located on the housing upper portion. A display and controls are located on the housing upper portion. The housing has two ends, with the speaker located in one of the ends.

There is also provided an electronic wildlife call that comprises electronics. The electronics comprise an electronic sound generator, memory containing at least one sound call, the memory connected to the sound generator, and at least one speaker connected with the sound generator. The electronics also comprises a receiver and a first power supply. A housing contains the electronics. The housing has a docking port. The docking port has at least one electrical contact. A remote control comprises a transmitter for communicating with the receiver as well as a second power supply. The remote control is capable of being located in the docking port, wherein the second power supply is recharged by way of the contact and the first power supply. The remote control is removable from the docking port.

In accordance with another aspect, the housing has two ends, a top portion, a bottom portion and sides extending between the ends. The docking port is located in one of the sides.

In accordance with still another aspect, the speaker is located in at least one end.

In accordance with another aspect, a handle is located on the housing top portion.

DESCRIPTION OF THE PREFERRED EMBODIMENT

FIGS. 1-4 show perspective views of the preferred embodiment of the electronic wildlife call unit 11. The call unit can be used by hunters, wildlife enthusiasts, etc. The call unit contains an internal library of plural sound calls for different animals. For example, the call unit may contain sound calls for birds, hogs, deer, rabbits, squirrels, coyotes, etc. Each animal may have plural sound calls. For example, there may be the following types of deer sound calls: doe bleat, buck grunt, buck bleat and buck snort. As another example, a call unit may have the following type of bird sound calls: blue jay, bobwhite quail, catbird, pileated woodpecker, crow, owl hoot, etc.

Figure 2:
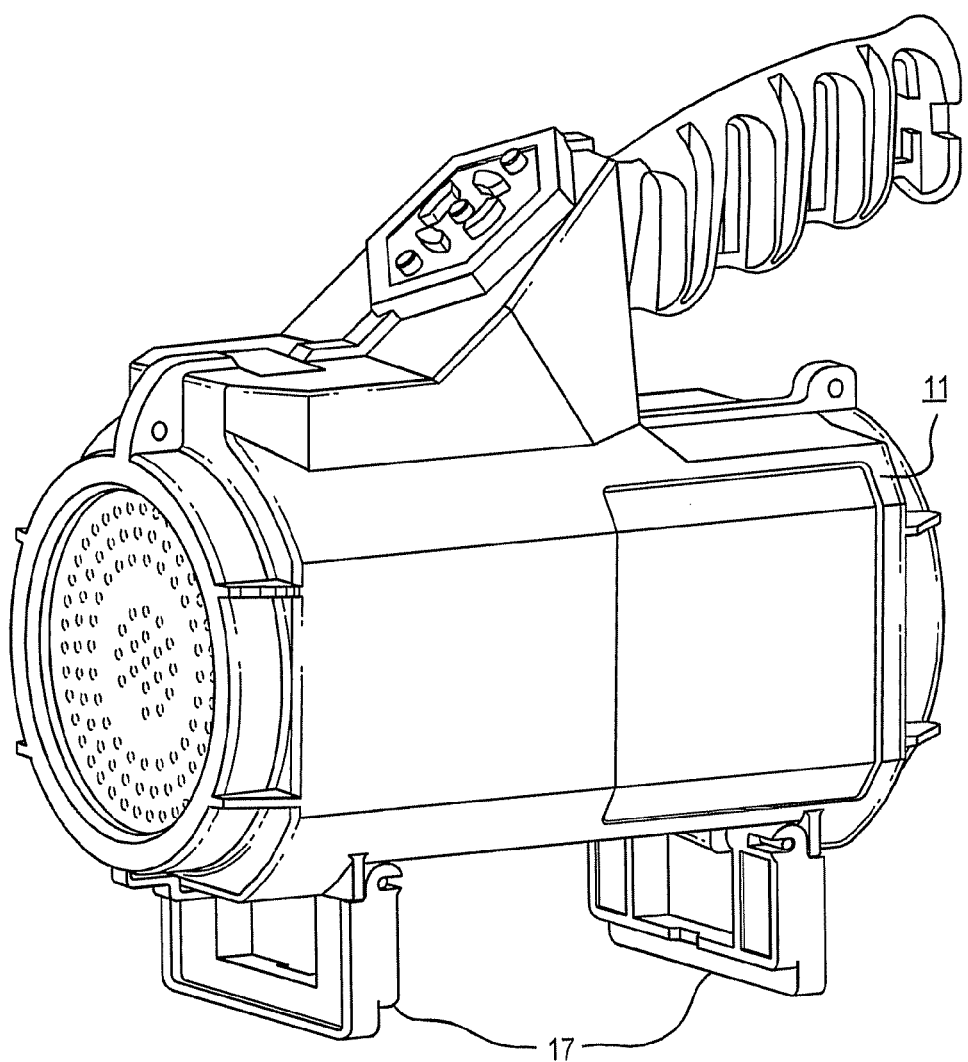
FIG. 2 is a perspective view of the electronic wildlife call shown with the legs in the deployed position.
Figure 3:
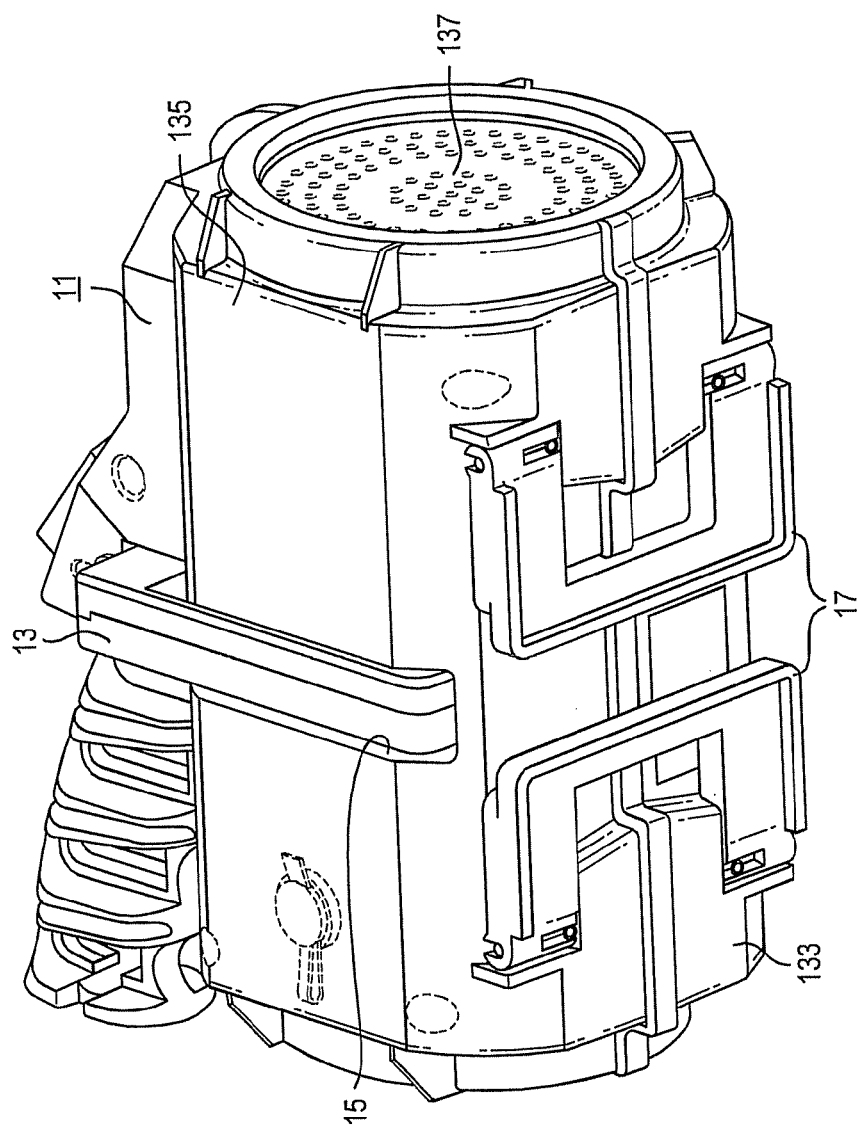
FIG. 3 is a perspective view of the electronic wildlife call showing the front end and the bottom portion of the housing, with the legs in the stowed position and the remote control located in the docking port.
Figure 3A:
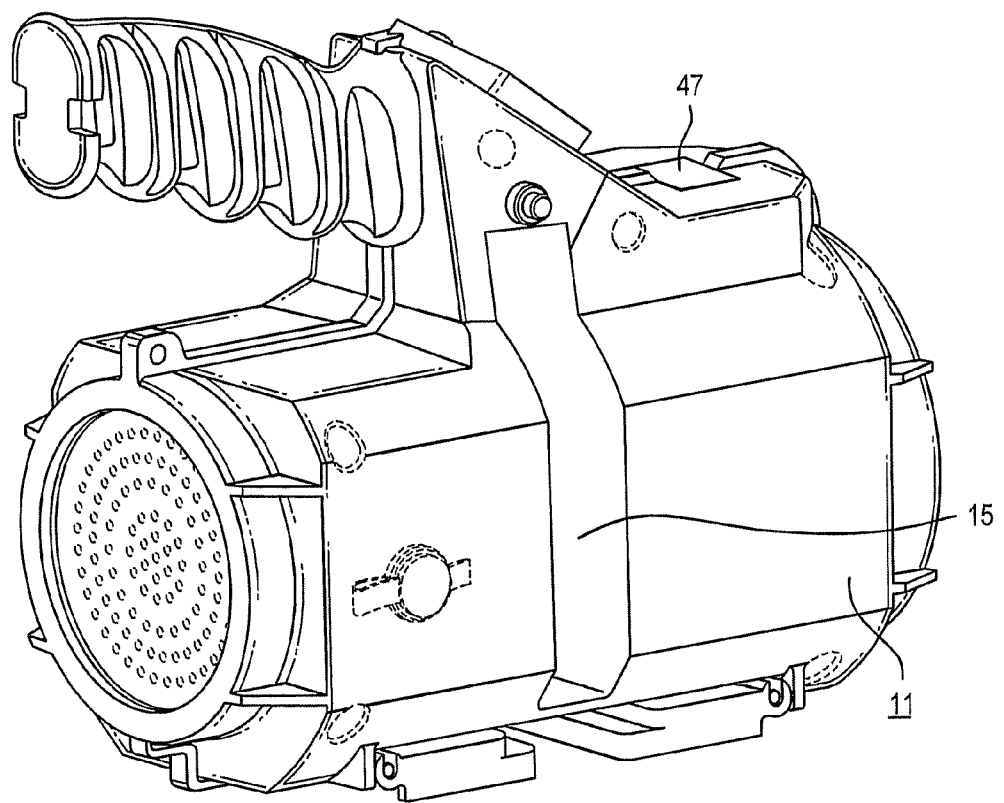
FIG. 3A is a perspective view of the electronic wildlife call showing the rear end and the docking port open.
Figure 4:
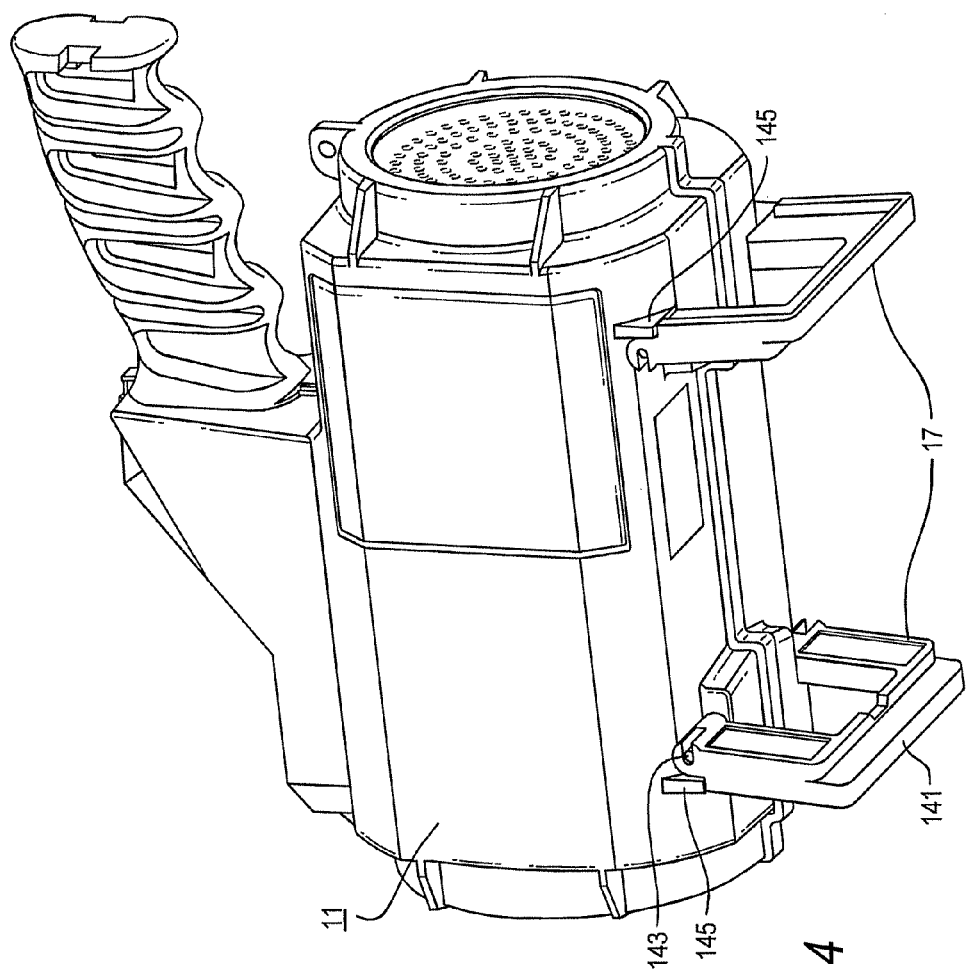
FIG. 4 is a perspective view of the electronic wildlife call showing the bottom portion and the rear speaker, with the legs in the deployed portion.
Figure 5:
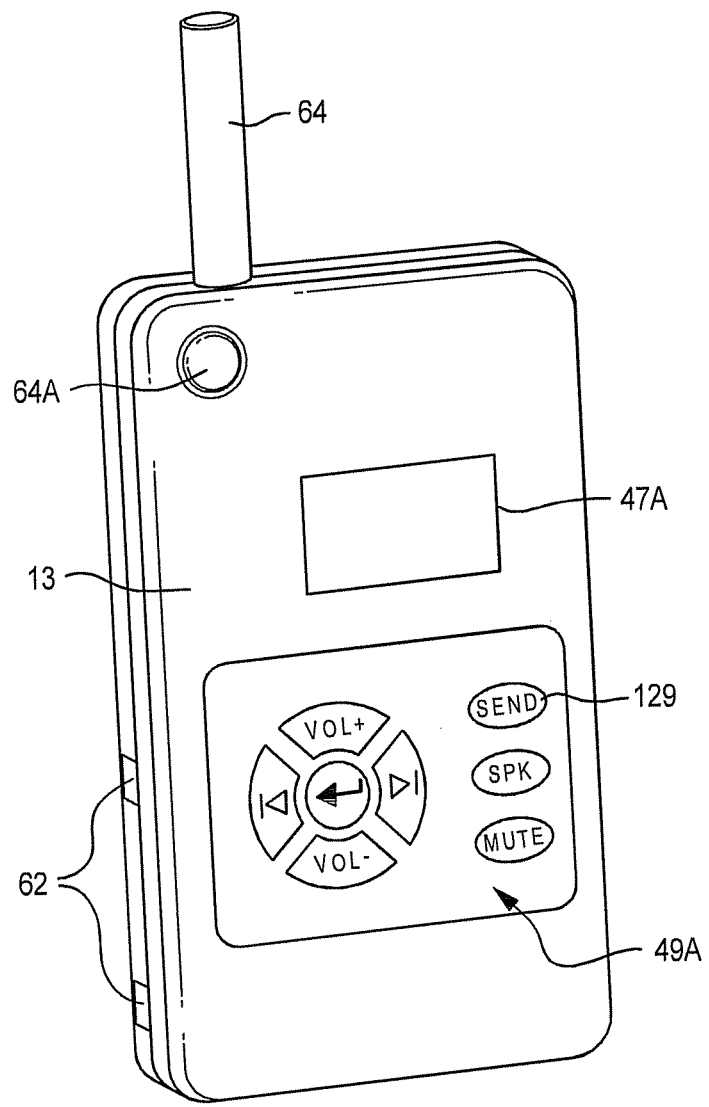
FIG. 5 is a perspective view of the remote control.

There is a main call unit 11 (see FIGS. 1-4) and a remote control 13 (see FIGS. 3, 3A and 5).

The main call unit 11 is easy to use. It can be operated by keys located on the main call unit itself or by keys located on the remote control 13. The main call unit has a docking port 15 receptacle for receiving the remote control. While the remote control 13 is located in the docking port 15, the power supply in the remote control is charged and the calls are synchronized between the main call unit and the remote control.

The main call unit 11 can be operated by holding it in a hand, but preferably the unit is set down on the ground or some other object. With the remote control 13, the operator can operate the unit from some distance. The main call unit has legs 17 that move between a stowed position (see FIGS. 1 and 3) and a deployed position (see FIGS. 2 and 4). When the legs are deployed, the main call unit 11 is elevated off of the ground. Thus, if the ground is wet or muddy (or dusty), the main call unit need not come in contact with the ground.

Figure 6:
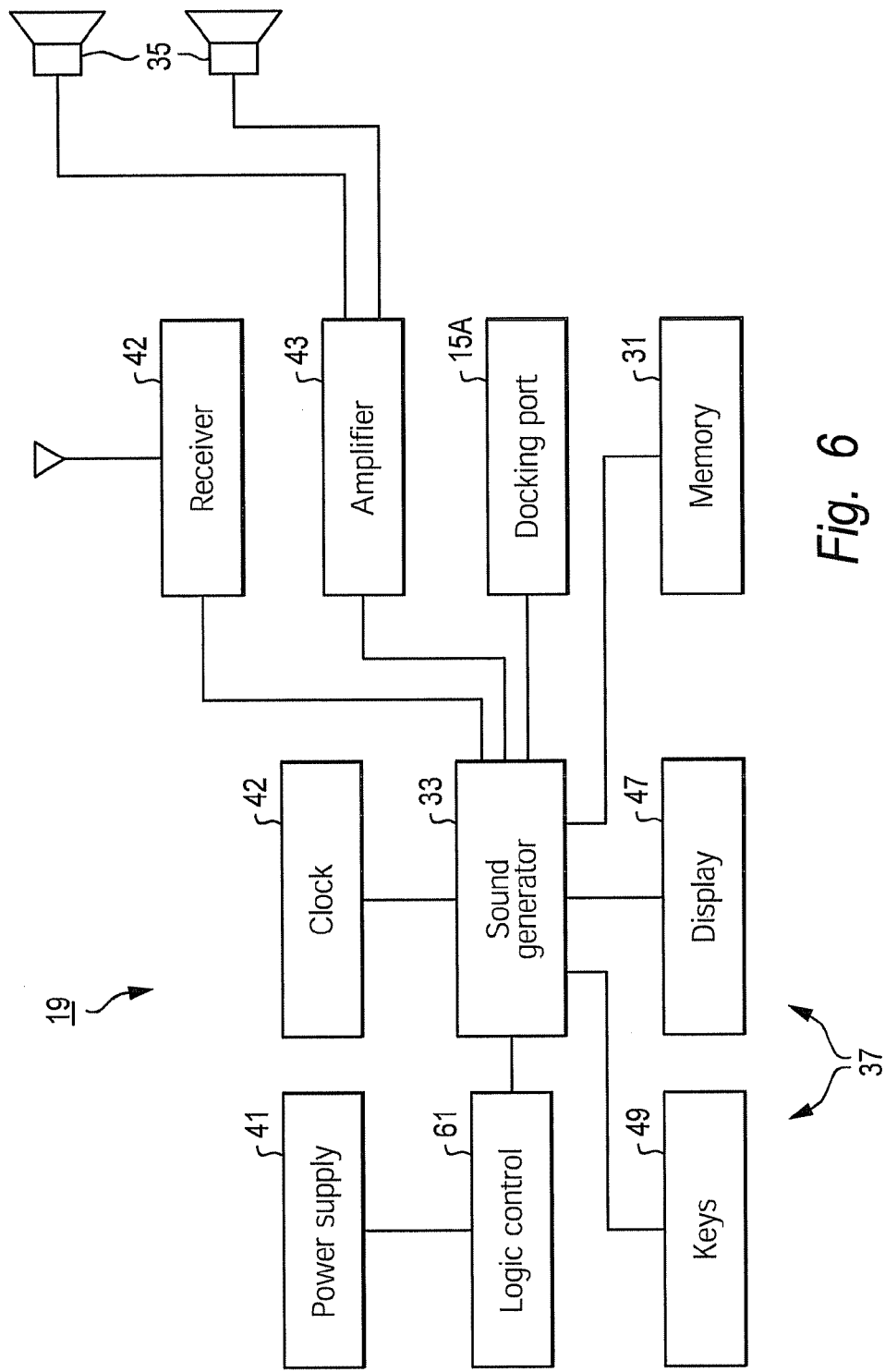
FIG. 6 is a block diagram of the electronics of the main call unit.

The main call unit 11 has electronics 19 and a housing 21 for the electronics. Referring to FIG. 6, the electronics include memory 31, a sound generator 33, speakers 35, a user interface 37, a docking port 15A, a receiver 42 and a power supply 41.

The memory 31 is nonvolatile computer memory, capable of holding sound files. In the preferred embodiment, the memory 31 is of the flash type and is provided on a memory card. The memory 31 contains the library of sound calls. The memory 31 is connected to the sound generator 33. The memory card may be either permanently installed, or may be replaceable in order to change out the library of calls.

The sound generator 33, or sound processor, is conventional and commercially available. The sound generator 33 has a clock 42. The sound generator 33 takes a sound file from the memory 31, decodes it and provides the resulting data stream to a digital-to-analog converter. The digital-to-analog converter may be integrated into the sound generator or it may be a separate device. In the preferred embodiment, the sound generator is an MP3 decoder, wherein the sound files are stored in memory in the MP3 (MPEG1 Audio Layer 3) format, which is a compressed digital format. The output of the sound generator and the digital-to-analog converter is an analog audio signal. The audio signals are output to an amplifier 43, which in turn drives the speakers 35. The speakers of course produce the sound. The amplifier 43 is connected to the speakers. Thus, the speakers are connected with the sound generator.

The user interface 37 of the main call unit 11 is connected to the sound generator 33 and includes a display 47 and keys 49. The display 47 provides information to the user such as the type of sound call, the volume level and the level of battery charge. In the preferred embodiment, the display is a liquid crystal display (LCD). The keys 49 allow a user to select the desired call and adjust the volume. In the preferred embodiment (see FIG. 1), the keys are laid out with an upper key 51, a lower key 53, a left key 55, a right key 57 and a center key 59. In addition, there is a mute key 58 and a speaker selection key 60. The mute key 58 turns the speakers 35 on and off, while the speaker selection key 66 selects one or both speakers to operate. The keys have printing (not shown) to indicate their respective function. The upper and lower keys 51, 53 control the volume of sound produced by the speaker. The upper key 51 increases the volume, while the lower key 53 decreases the volume. The left, right and center keys 55, 57, 59 are used to select the particular call that is to be sounded.

The display 47 lists the selection of the calls available from the library calls in the general format:

Animal
call, where the animal is in general the particular animal and the call is the particular call for that animal, as the animals can have plural calls.

The electronics includes electrical components 15A for the docking port 15, such as electrical contacts for contacting the electrical contacts 68 (see FIGS. 5 and 6A) on the remote control 13.

Figure 6A:
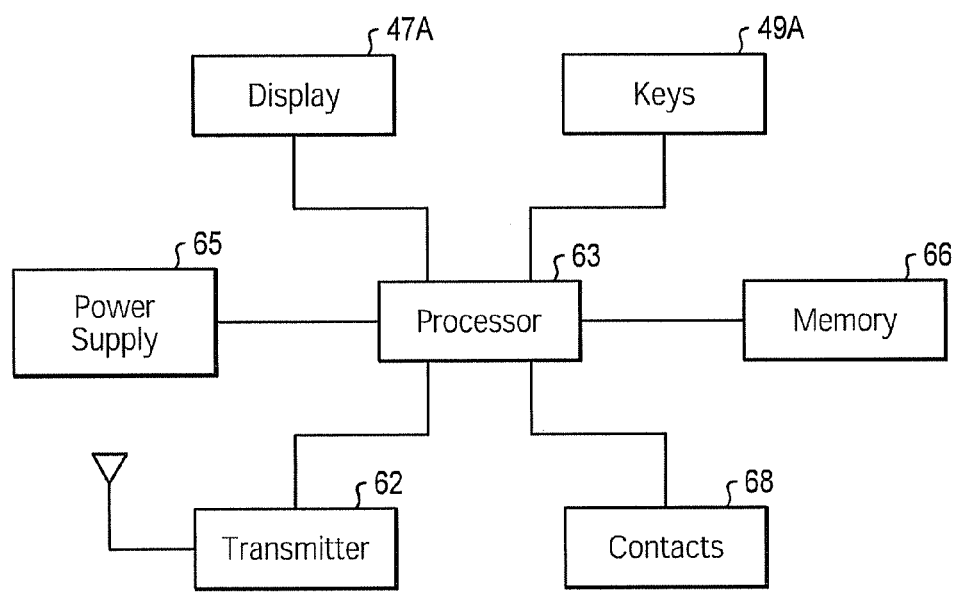
FIG. 6A is a block diagram of the electronics of the remote control.

The receiver 42 is in wireless communication with a transmitter 62 in the remote control 13 (see FIG. 6A). The transmitter 62 and receiver 42 can communicate using radio frequency (rf), sound, light, or other communication media. The transmitter and receiver are each connected to an antenna. In the main call unit, the antenna is fixed. In the remote control, the antenna 64 can be stowed inside of the remote control. Once the antenna is stowed, then the remote can be inserted into the docking port 15. The remote has a release mechanism 64A that allows the antenna 64 to be deployed, as shown in FIG. 5.

The power supply 41 is, in the preferred embodiment, batteries. The batteries can be rechargeable, or nonrechargeable. A charging port is provided to allow the unit to be plugged into an electrical wall outlet as an alternative power supply. Control logic 61 is provided to regulate the electrical power from the power supply to the remaining electronics.

FIG. 6A shows a block diagram of the electronics of the remote control 13. There is a microprocessor 63, the transmitter 62, a display 47A, keys 49A, a power supply 65 and memory 66. The display 47A and keys 49A are similar to the display 47 and keys 49 on the main call unit. The memory 66 stores the selection, or menu, of calls that are available in the library of calls. The power supply 65 is typically a battery, such as a rechargeable battery. The electronics are contained in the case shown in FIG. 5. When the remote control is located in the docking port, the user uses the keys and display located on the main call unit.

Figure 7:
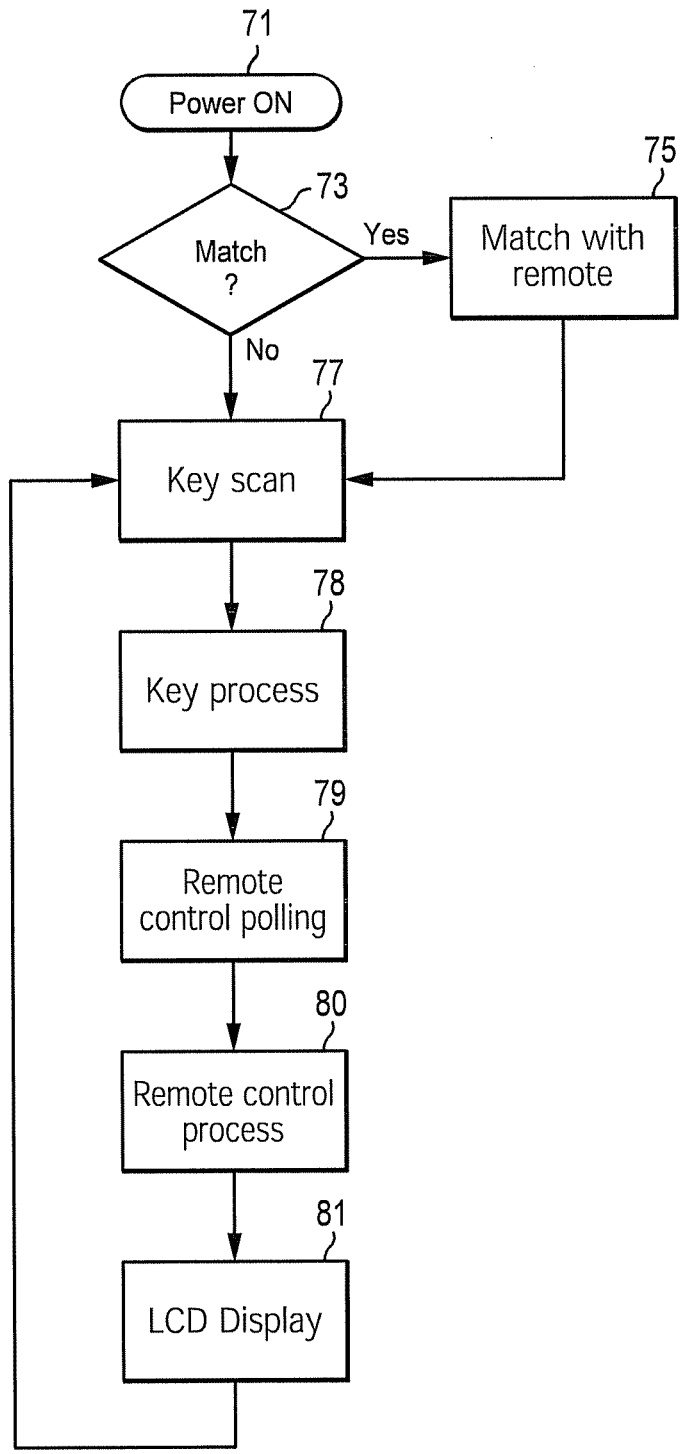
FIG. 7 is a flow chart of the primary program of the main call unit operation.
Figure 8:
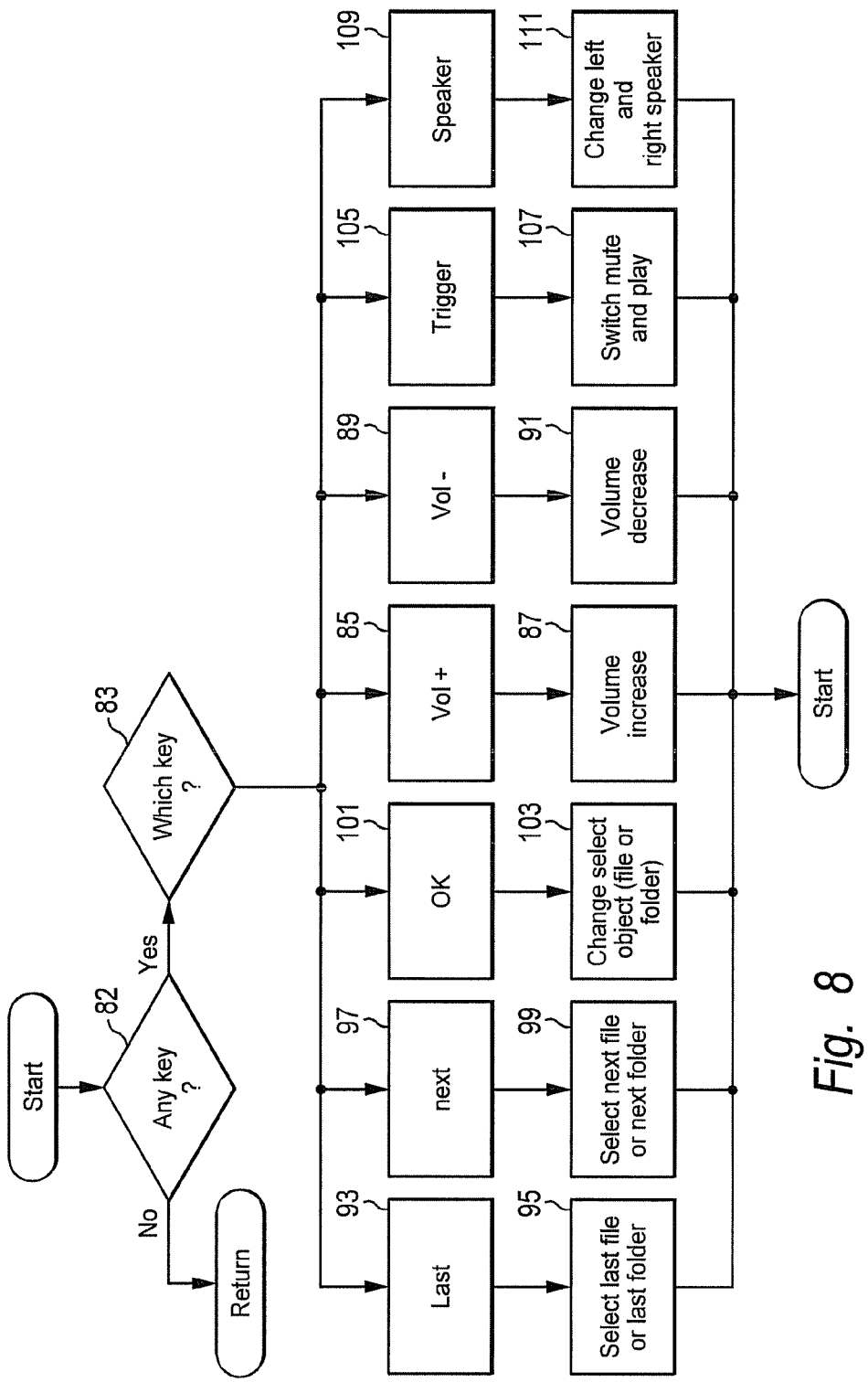
FIG. 8 is a flow chart illustrating the key processing program in the main call unit.

The operation of the main call unit will now be described, with reference to FIGS. 7 and 8. FIG. 7 shows a flow chart for the main program, while FIG. 8 illustrates a key processing program. The processes of FIGS. 7 and 8 are implemented by software that is operated by the sound generator 33 in the main call unit.

The main call unit is turned on by pressing the appropriate key, step 71. In the preferred embodiment, pressing and holding the center key 59 for a predetermined period of time turns on the display and powers the electronics. The main call unit automatically turns itself off if not used for a predetermined period of time in order to conserve electrical power. Once the unit is turned on, the program determines if there is a need to match or sync, with the remote control 13, step 73. If the main call unit 11 has had a change in its call library, then this change is loaded to the remote control. For example, if addition calls have been added to the library in the memory 31, then the call identifiers are added to the menu available on the remote control. If there is a need to match or sync, the result of step 73 is YES and step 75 is performed, wherein the remote control is matched or synced. To continue with the example above, the newly added call identifiers are loaded onto the remote control when the remote control is located in the docking port 15. The data is loaded through the contacts 62 and into the memory 66 (FIG. 6A). After step 75, or if the result of step 73 is NO, next, in the main program of FIG. 7, keys 49 are scanned to determine if they have been pressed, step 77. If a key has been pressed, then a key process program is called, wherein the pressed key is identified and the associated action taken, step 78. Commands from the remote control are polled, step 79. Polling occurs internally to the main call unit. If a remote command has been received, the command is processed, step 80 in the same manner as key commands are processed in step 78. Then, the display 47 is updated to reflect any change caused by the pressed key, step 81. For example, if the volume level is increased, then this is indicated on the display. The process then repeats to scan for another pressed key.

FIG. 8 illustrates the key processing program of steps 78, 80 in more detail. The program determines if a key has been pressed, step 82. If NO key has been pressed, then the program returns to scan for pressed keys, step 77. Steps 77 and 82 can be combined into a single step or be distinct steps as shown. If YES, a key has been pressed, then the program determines which key was pressed, step 83. If the volume increase key 51 was pressed, then this is identified, step 85 and the volume is increased in an incremental amount, step 87. Likewise, if the volume decrease key 53 was pressed, this is identified, step 89 and the volume is decreased in an incremental amount, step 91. As the volume is increased or decreased, the display 47 is updated to show the change (step 79 of FIG. 7). This is done by updating the visual volume indicator on the display.

If the left key 55, or "last" key is pressed, then this is detected, step 93 (FIG. 8) and the last file or folder is selected, step 95. Likewise, if the right key 57, or "next" key is pressed, this is detected, step 97 and the next file or folder is selected, step 99. If the center key 59 is pressed, then this is detected, step 101 and the selected object, which is either a file or folder, is changed to reflect the newly designated object, step 103. The center key 59 acts as a toggle switch to change from file to folder and back to file. When pressed once, the selected object changes to, for example, file, when the center key is pressed again the selected object changes to folder, when the center key is pressed again, the selected object changes to file, and so on. The selected object is what is used to produce a sound call.

If the user presses the mute button 58, this is detected, step 105 and the sound generator 33 switches between mute and play, step 107. When the sound generator is on mute, no sound call is produced. When the sound generator is on play, a sound call is produced.

When the speaker button 60 is pressed, this is detected, step 109 and the active speakers are toggled through as right (or front), left (or rear), or both speakers, step 111. The audio call is produced by the active speakers.

The sound calls are located in the library and stored in memory 31. The animals and calls are preferably listed in alphabetical order. Because the display is physically small, only one animal and one call at a time are listed on the display. The sound calls are scrolled on the display. To simplify the scrolling, the sound calls are organized by animals. The animals represent folders, while sound calls for a particular animal represent a file in a folder. An example library is shown in Table 1:

TABLE 1

| Animal (folder) | Call (file) |
| --- | --- |
| Coyote | coyote bark |
| | coyote female challenge |
| | male communicative |
| | coyote pup distress |
| | coyote pup group howl |

TABLE 1-continued

| Animal (folder) | Call (file) |
| --- | --- |
| Hog | Javelina adult distress |
| | Javelina young distress |
| | pig adult distress |
| | pig young distress |
| Rabbit | cottontail distress |
| | jackrabbit distress |
| | pygmy cottontail distress |
| Whitetail Deer | buck fight |
| | buck growl |
| | buck grunt |
| | buck snort wheeze |
| | doe estrus bleat |
| | fawn bawl |

To change the particular call which will be sounded, the user views the call shown in the display 47. As previously discussed, the display shows the type of animal and the particular call for that animal. To change the call, the left key 55 (last) and/or the right key 57 (next) is pressed to scroll from animal to animal and call to call. Scrolling is done from animal to animal and once an animal is selected from sound call to sound call for that selected animal. This eliminates the need to scroll through the entire list or sound calls. Also, the top of the list loops to the bottom and vice versa. For example, using the call library of Table 1, suppose that the display shows:

Coyote
coyote bark and the user wishes to change this to Coyote, male communicative. The user presses the right key 57 twice to scroll to Coyote, coyote female challenge and to Coyote, mail communicative. Alternatively, because the top and bottom of the lists loop to each other, the user could press the left key 55 twice to scroll from the bottom of the list of Coyote sound calls to Coyote, Coyote pup distress and to Coyote, mail communicative.

To change to another animal, the user presses the center key 59. The display shows Coyote as flashing to indicate that the left and right keys 55, 57 will change the animal. Pressing the right key scrolls down through the library of Table 1 to Hog. From Coyote, pressing the left key scrolls up through the animal library to Whitetail Deer. Pressing the center key 59 selects the object to be scrolled from the animal (folder) to the sound call (file), so the display now shows:

Whitetail Deer
buck fight

The user is able to scroll both up and down the library using the keys. Note that the user was able to skip the specific calls listed under Coyote, Hog and Rabbit in order to change from a coyote call to a whitetail deer call. This minimizes the number of key strokes and entries.

When the user scrolls to a new animal, the selected sound call by default is the top listed call for that animal in the library. For example, when the user selects Hog, selects calls, the display shows Javelina adult distress. Of course, the user can scroll through the Hog calls to select the desired call.

When the remote control is located in the docking port 15, the main unit power supply 41 charges the power supply 65 in the remote control.

When the remote control 13 is out of the docking port, the operator can control the main call unit 11. The operates presses the appropriate keys and brings up the desired call identification on the display 47A (see FIG. 5). Then, the operator presses the send button 129 to transmit the call identifier (e.g. Whitetail Deer, buck fight) to the main call unit 11.

The housing 21 has, in addition to the docking port 15 receptacle, the display 47, keys 49, a top portion 131, a bottom portion 133, sides 135 between the top and bottom portions, and ends 137 (see FIGS. 1-4). The sides 135 extend between the ends 137. A speaker 35 is located in each end 137 of the main call unit. The ends 137 have perforations to allow sound to escape. A handle 139 is provided on the top portion.

Figure 1:
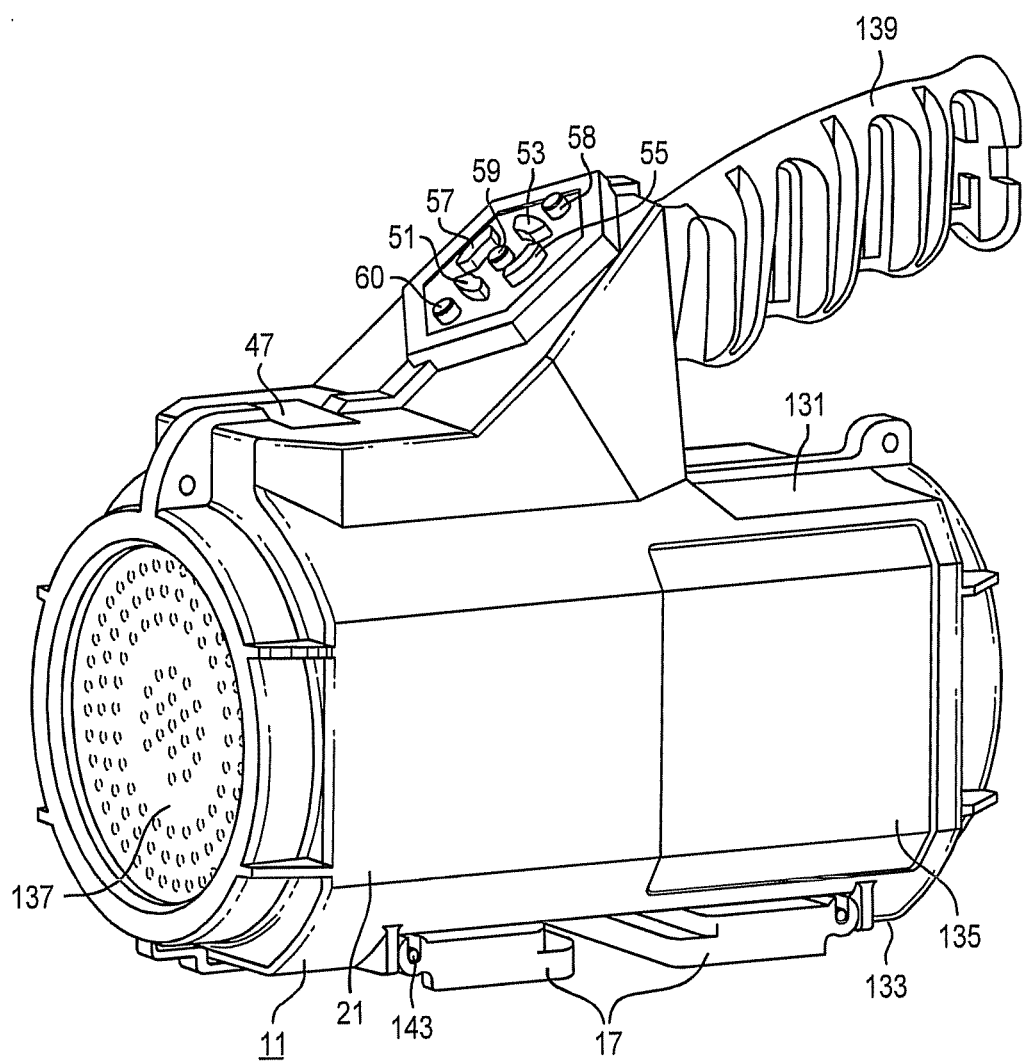
FIG. 1 is a perspective view of the electronic wildlife call, shown in accordance with a preferred embodiment, with the legs in the stowed position.

The legs 17 are provided on the bottom portion of the housing. Each leg is "U" shaped, having a base 141 and is coupled to the housing by a pin 143. The legs are movable between the stowed positions, as shown in FIGS. 1 and 3, and a deployed position, as shown in FIGS. 2 and 4. The legs pivot about the respective pivot pin 143 to move between the stowed and deployed positions. Stops 145 are provided to prevent the legs from over-rotating beyond the deployed position.

When the legs 17 are in the deployed position, they extend out transversely from a longitudinal axis of the housing, which longitudinal axis extends between the ends 137. The base 141 of the legs come into contact with the ground. By providing a base 141, which effectively acts as a beam to distribute the weight of the unit over a larger area, the legs do not sink into soft ground, but rather the call unit is supported above the ground. The housing and the speakers are elevated above the ground, thereby minimizing moisture entry and contact of the housing of the main call unit with the ground, whether the ground be muddy or dry and dusty.

When the legs 17 are in the stowed position, they are aligned with the longitudinal axis of the housing. The sides of the legs are exposed and form bearing surfaces that contact the ground. Thus, the housing can be set on the ground with the legs in either the stowed position or the deployed position. When the legs are in the stowed position, the housing is much closer to the ground.

The foregoing disclosure and showings made in the drawings are merely illustrative of the principles of this invention and are not to be interpreted in a limiting sense.

The invention claimed is:

1. An electronic wildlife call, comprising:
   a) electronics, comprising:
      i) an electronic sound generator;
      ii) memory containing at least one sound call, the memory connected to the sound generator;
      iii) at least one speaker connected with the sound generator;
   b) the electronic wildlife call also comprising a housing and legs, the housing containing the electronics, the housing having an upper portion and a lower portion;
   c) the legs located on the housing lower portion, the legs each having a bottom portion and a side portion, the legs being movable between a deployed position and a stowed position, the legs pivoting to move between the deployed and stowed positions, wherein when the legs are in the deployed position and the electronic wildlife call is set on the ground by the legs, the bottom portion of each leg contacts the ground and the housing is elevated above the ground, and when the legs are in the stowed position and the electronic wildlife call is set upon the ground, the side portion of each leg contacts the ground.

2. The electronic wildlife call of claim 1 further comprising the handle located on a housing upper portion.

3. The electronic wildlife call of claim 2 further comprising a display and controls located on the housing upper portion.

4. The electronic wildlife call of claim 1 further comprising a display and controls located on the housing upper portion.

5. The electronic wildlife call of claim 1, wherein the housing is elongated with two ends, with the speaker located in one of the ends.

6. The electronic wildlife call of claim 1, wherein the electronics further comprises a receiver, further comprising a remote control with a transmitter, the transmitter and receiver in communication.

7. The electronic wildlife call of claim 1 comprising:
   a) a handle located on a housing upper portion;
   b) a display and controls located on the housing upper portion;
   c) the housing is elongated with two ends, with the speaker located in one of the ends;
   d) the electronics further comprises a receiver, further comprising a remote control with a transmitter, the transmitter and receiver in communication.

8. An electronic wildlife call, comprising:
   a) electronics, comprising:
      i) an electronic sound generator;
      ii) memory containing at least one sound call, the memory connected to the sound generator;
      iii) at least one speaker connected with the sound generator;
      iv) a receiver;
      v) a first power supply;
   b) the electronic wildlife call also comprising a housing and a remote control, the housing containing the electronics, the housing having a receptacle, the receptacle having a docking port, the docking port having at least, one electrical contact, the receptacle having first and second walls that are spaced apart from each other;
   c) the remote control comprising a transmitter for communicating with the receiver and a second power supply, the remote control capable of being located in the docking port wherein the second power supply is recharged by way of the at least one contact and the first power supply, the remote control being removable from the docking port, the remote control having a face that contains controls for the electronics, the controls on the face located between the first and second walls of the receptacle when the remote control is located in the docking port.

9. The electronic wildlife call of claim 8 wherein the housing has two ends, a top portion, a bottom portion and sides extending between the ends, the docking port located in one of the ends.

10. The electronic wildlife call of claim 9 wherein the speaker is located in at least one of the ends.

11. The electronic wildlife call of claim 10 further comprising a handle located on the housing top portion.

12. The electronic wildlife call of claim 1 wherein the bottom portion of each leg is horizontal and the side portion of each leg is vertical when the respective leg is in the deployed position.

13. The electronic wildlife call of claim 1 wherein the housing has a stop for each leg, the stop limiting the amount of pivoting of the respective leg as it moves from the stowed position to the deployed position.

14. The electronic wildlife call of claim 1 wherein when the legs pivot to the stowed position, the legs are located underneath the housing when the call is set upon the ground.

15. The electronic wildlife call of claim 2 wherein the handle has two ends, with an end coupled to the housing upper portion and the other end free.

16. The electronic wildlife call of claim 3 wherein the housing upper portion has a projecting portion, the handle extending from the projecting portion, the controls located on the projecting portion and being between the display and the handle.

17. The electronic wildlife call of claim 16 wherein the handle has a free end.

18. The electronic wildlife call of claim 8 wherein the remote control has plural edges, with one of the edges located inside the receptacle and another of the edges exposed from the receptacle.

19. The electronic wildlife call of claim 8 wherein the remote control has plural corners, with one of the corners located inside of a receptacle and another of the corners located outside of the receptacle.

20. The electronic wildlife call of claim 11 further comprising a display and main controls, wherein the housing top portion further comprises a projecting portion, the main controls located on the projecting portion, the handle extending from the projecting portion, the main controls located between the display and the handle.

21. The electronic wildlife call of claim 8 wherein the housing is elongated along a longitudinal axis between two ends, the housing having a handle that extends substantially in the longitudinal direction, the receptacle located between the two ends, the handle located transversely of the receptacle.

22. The electronic wildlife call of claim 21 further comprising legs pivotally coupled to the lousing, the legs located transversely of the receptacle and movable between a stowed position and a deployed position.

23. The electronic wildlife call of claim 8 further comprising legs pivotally coupled to the housing.

\* \* \* \* \*